Oct. 18, 1960 S. A. SCHERBATSKOY 2,957,083
RADIOACTIVITY WELL LOGGING SYSTEM
Filed June 30, 1958 6 Sheets-Sheet 1
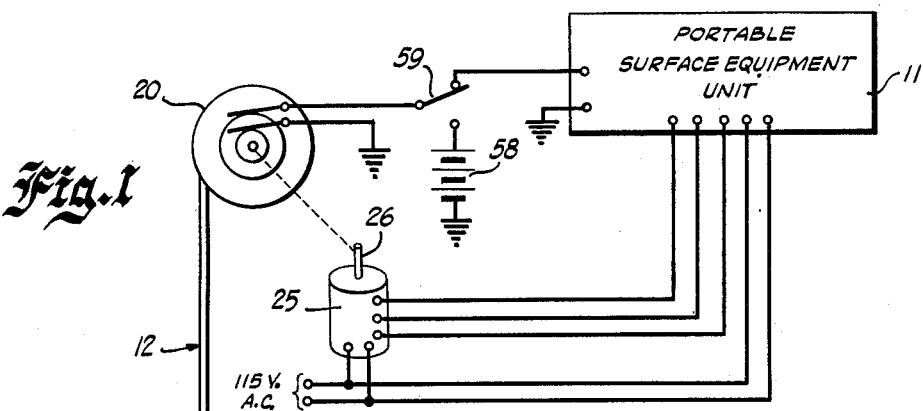
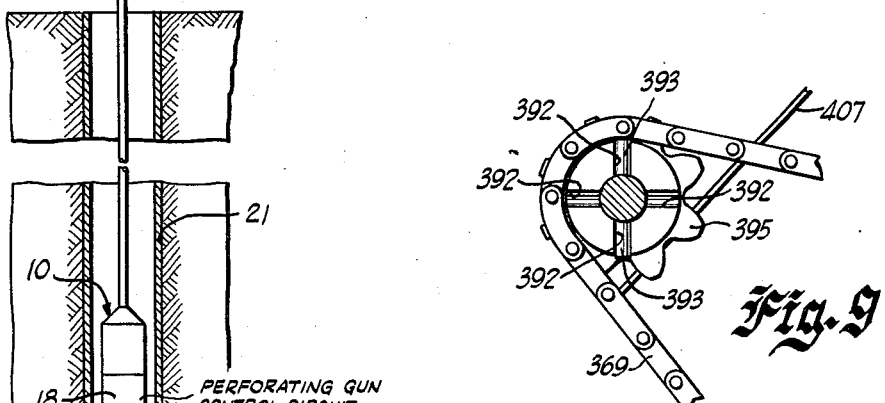
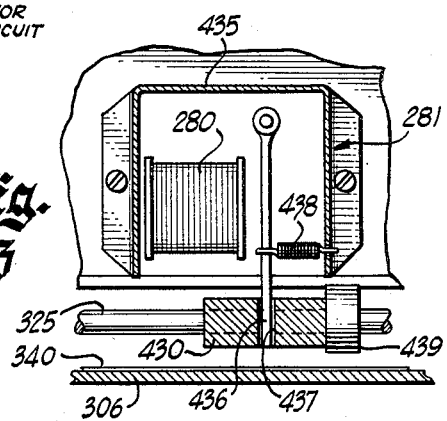
INVENTOR.
Serge A. Scherbatskoy
BY
Mason, Kolehmainen, Rathburn and Wyss.
Attorneys.

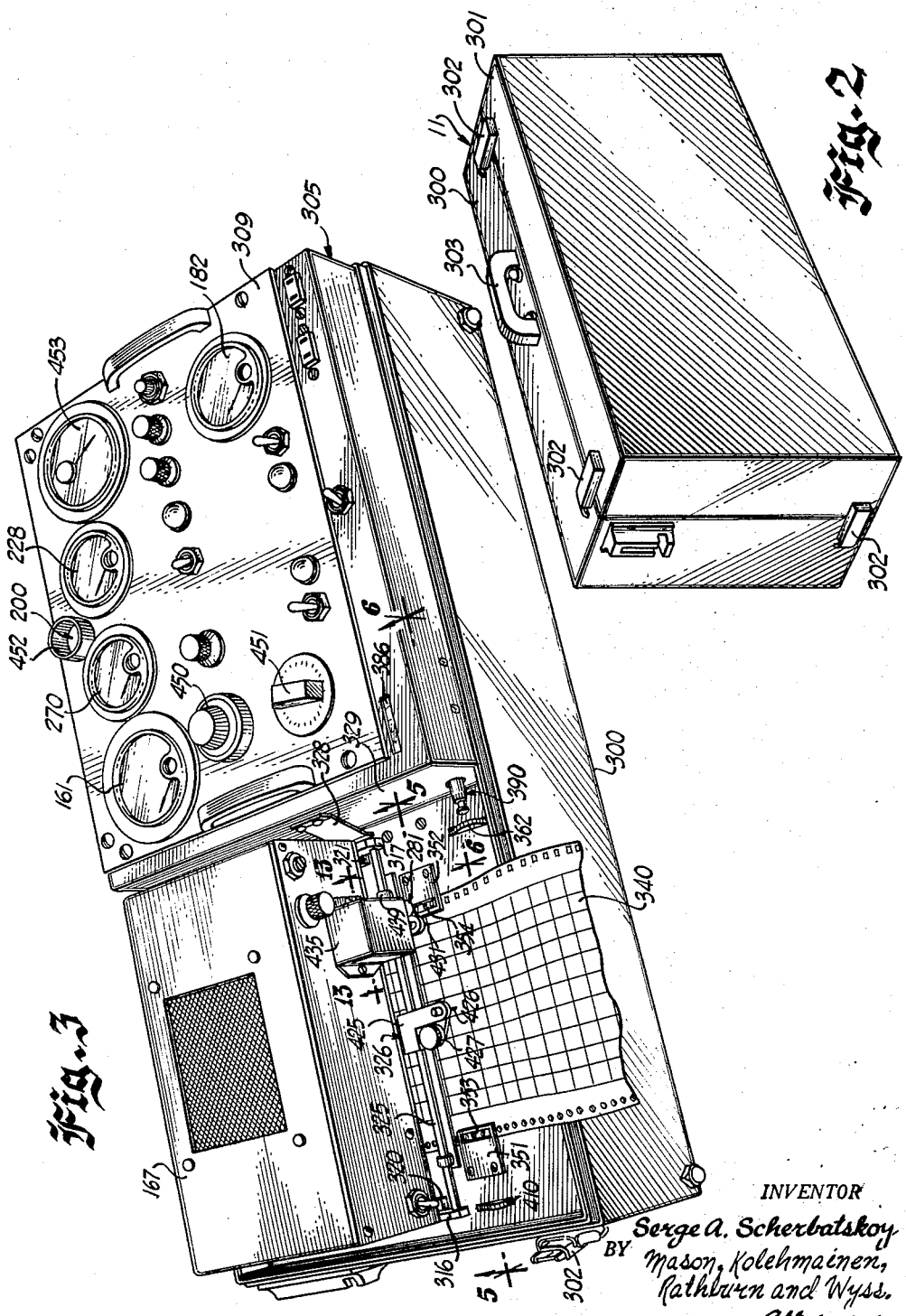

Oct. 18, 1960 S. A. SCHERBATSKOY 2,957,083
RADIOACTIVITY WELL LOGGING SYSTEM
Filed June 30, 1958 6 Sheets-Sheet 3

INVENTOR.
Serge A. Scherbatskoy
BY
Mason, Kolehmainen, Rathburn and Wyss.
Attorneys.

Oct. 18, 1960   S. A. SCHERBATSKOY   2,957,083
RADIOACTIVITY WELL LOGGING SYSTEM
Filed June 30, 1958   6 Sheets-Sheet 4
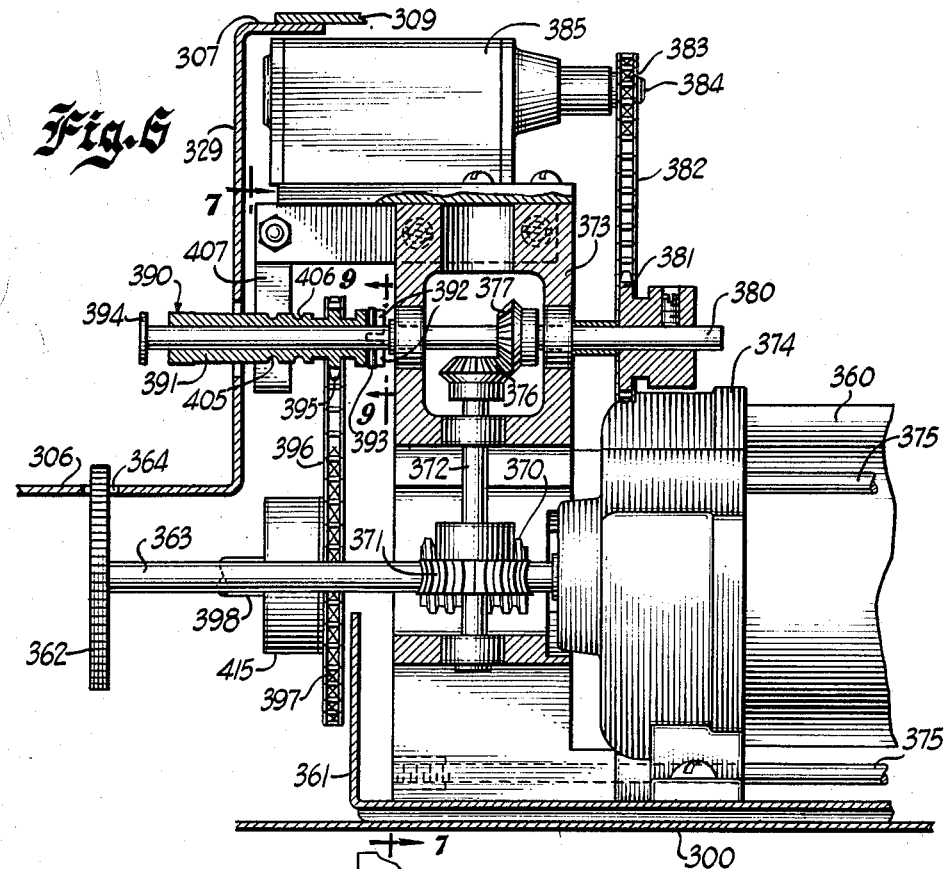
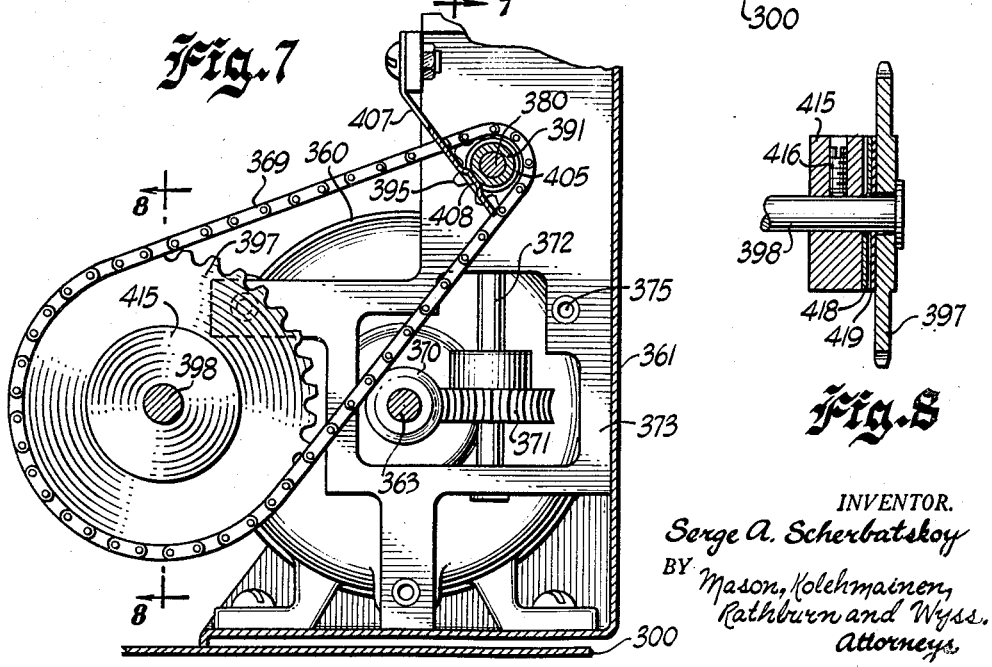
INVENTOR.
Serge A. Scherbatskoy
BY Mason, Kolehmainen,
Rathburn and Wyss.
Attorneys.

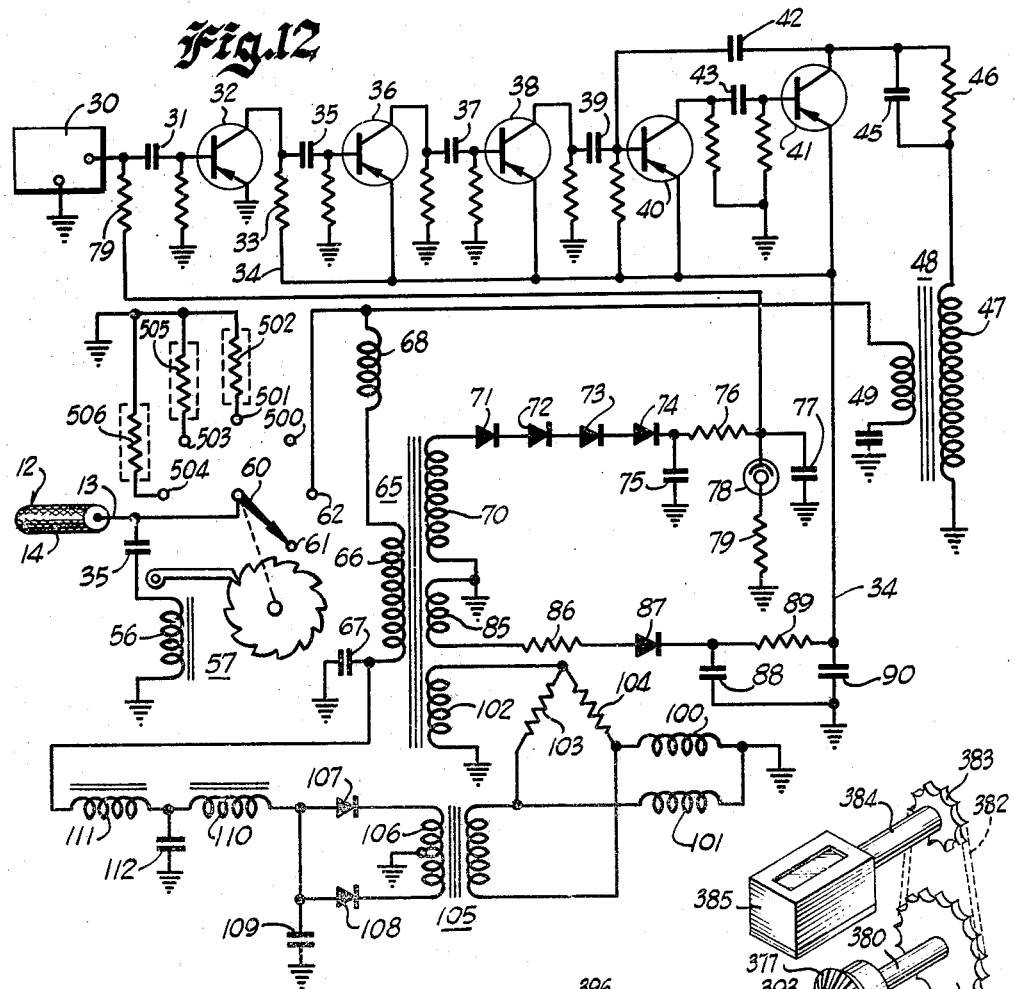
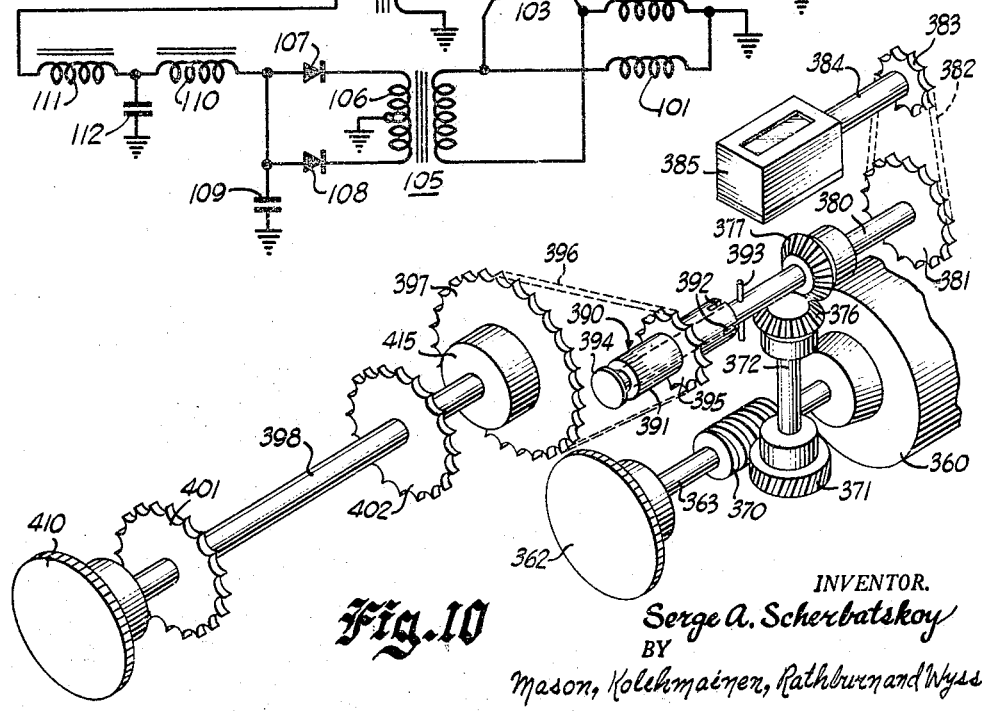

United States Patent Office 2,957,083
Patented Oct. 18, 1960

2,957,083

RADIOACTIVITY WELL LOGGING SYSTEM

Serge A. Scherbatskoy, Tulsa, Okla., assignor, by mesne assignments, to PGAC Development Company, Houston, Tex., a corporation of Texas Filed June 30, 1958, Ser. No. 745,714

15 Claims. (Cl. 250—83.3)

The present invention relates to radioactivity well logging systems, and, more particularly, to a radioactivity well logging system in which a unitary subsurface unit is employed to provide a combined radioactivity well logging and casing perforating operation and wherein a log of casing collars is also produced. It is a principal object of the invention to provide such a combined well logging and casing perforating system in which simplified circuitry is employed in the subsurface unit of the system and a compact and portable surface equipment unit is provided which contains all of the necessary equipment to provide both a radiation log and a casing collar log while cooperating with the casing perforating equipment in the subsurface unit.

It is another object of the present invention to provide a new and improved radioactivity well logging system in which a continuous log of either the radiations traversed by the subsurface unit or the magnetic properties of the casing can be selectively obtained.

It is a further object of the present invention to provide a new and improved radioactivity well logging system wherein a portable surface equipment unit is provided in which facilities are provided for adjusting the strip chart of the recorder relative to the depth indicator of the surface unit.

It is still another object of the present invention to provide a new and improved radioactivity well logging system wherein a portable surface equipment unit is provided in which a common power transformer is utilized to develop operating potentials for the frequency meter portion of the surface equipment, operating potentials for a cathode ray tube, and a deflection voltage for this tube so that the waveform produced on the cable of the well logging system can be displayed.

The invention, both as to its organization and method of operation, together with further objects and advantages thereof, will best be understood by reference to the following specification taken in connection with the accompanying drawings, in which:

Fig. 1 diagrammatically illustrates a combined well logging and casing perforating system characterized by the features of the present invention;

Fig. 2 is a perspective view of the portable surface equipment unit of the system of Fig. 1;

Fig. 3 is a perspective view of the unit of Fig. 2 with the top cover thereof removed;

Fig. 6 is a fragmentary sectional view taken along the lines 6—6 of Fig. 3;

Fig. 7 is a sectional view taken along the lines 7—7 of Fig. 6;

Fig. 8 is a sectional view taken along the lines 8—8 of Fig. 7;

Fig. 9 is a sectional view taken along the lines 9—9 of Fig. 6;

Fig. 10 is a diagrammatic perspective view of the gearing arrangement employed in the surface unit of Fig. 3;

Fig. 12 is an electrical schematic diagram of the electrical equipment provided in the subsurface unit of the system of Fig. 1, and Fig. 13 is a sectional view taken along the lines 13—13 of Fig. 3.

Figure 4:
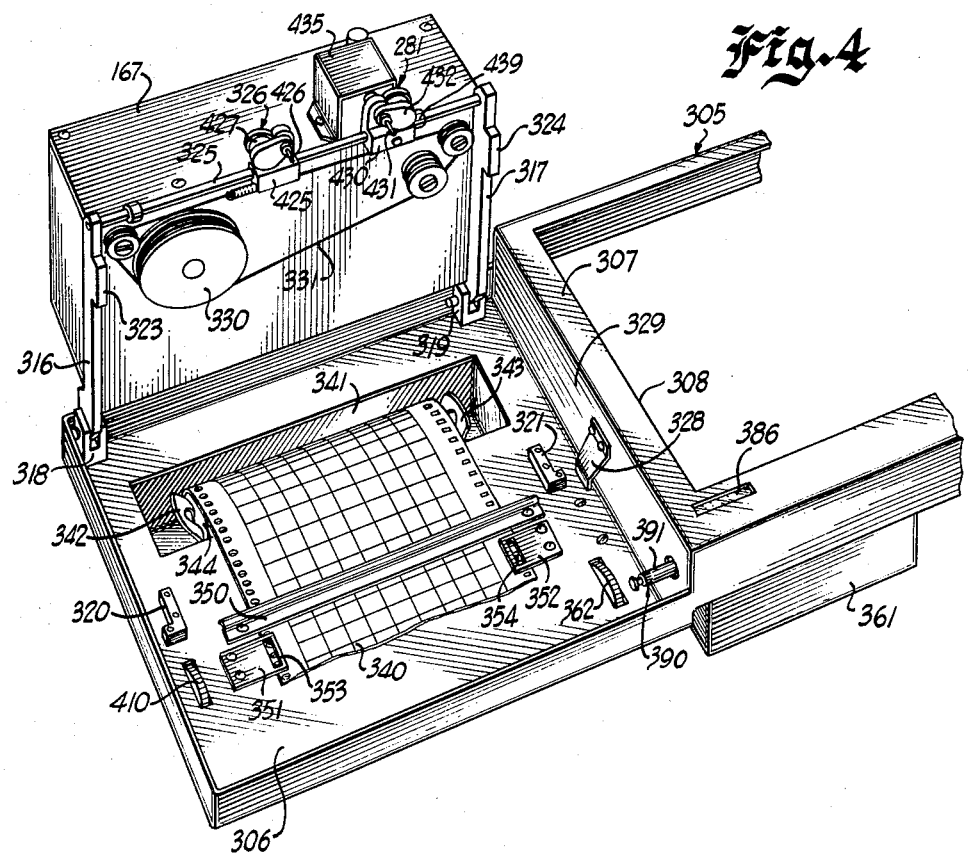
Fig. 4 is a fragmentary perspective view of a portion of the surface unit of Fig. 3 showing the recorder thereof in an elevated position.

Referring now to the drawings and more particularly to Fig. 1 thereof, the combined radioactivity well logging and perforating gun system of the present invention is therein illustrated as generally comprising a unitary perforating gun and subsurface well logging unit indicated generally at 10 and a portable surface equipment unit indicated generally at 11, these units being interconnected by means of a single conductor coaxial cable 12. The arrangement illustrated is particularly adapted for the production of a combined gamma ray and casing collar log of a cased borehole in conjunction with the perforating of the casing by means of explosive jet charges.

In general, the subsurface equipment 10 comprises a perforating gun portion indicated generally at 15, which may comprise one or more banks of explosive jet charges which may be fired either sequentially or in unison by detonation of any suitable firing cap arrangement, a radiation detector and its associated amplifier and wave shaping circuits indicated generally at 16, a pair of collar finder coils and their associated signal circuit indicated generally at 17 which are employed generally to determine the magnetic properties of the well casing and specifically to locate casing collars traversed by the subsurface unit 10, and a perforating gun control circuit indicated generally at 18. These components are all housed within a sealed housing having the requisite physical strength to withstand the fluid pressures encountered and are preferably located in the housing in the particular order illustrated. The unit 10 is arranged to be lowered into the borehole by means of the cable 12 which is of the coaxial type and comprises a center conductor 13 surrounded by and insulated from an armored sheath 14. This sheath is appropriately grounded at the earth's surface and the portable surface equipment unit 11 is arranged to supply alternating current power over the cable 12 to the subsurface unit 10. As will be understood by those skilled in the art, the cable 12 extends into the borehole and is carried on a suitable power operated drum 20 located at the earth's surface. Conventional drive facilities may be provided for rotating the drum 20 in either direction whereby the cable 12 may be fed into or reeled out of the borehole so as to move the subsurface unit 10 longitudinally of the borehole. The borehole is lined with the usual ferrous metal casing 21 which is provided with collar coupling elements, not shown. These elements have the effect of increasing the wall thickness of the casing at evenly spaced points along the length of the casing and hence serve as casing section markers. In accordance with a feature of the present invention, the facilities normally provided on the perforating truck for raising and lowering the cable 12 are utilized in providing a radiation log in correlation with depth. Thus, the selsyn generator 25, which is normally provided on a perforating truck and is geared to the power operated drum 20 so that the shaft 26 of the generator 25 rotates in synchronism therewith, is employed to provide an electrical signal which is supplied to the portable surface equipment unit 11 wherein this signal is supplied to a selsyn motor equipped to drive the strip chart of the recorder in the unit 11 as well as a depth indicating counter. As will be readily understood by those skilled in the art the rotor of the selsyn generator 25 is supplied with alternating current power which is also connected to the selsyn motor provided in the portable surface equipment 11.

Considering now the circuit arrangement provided in the subsurface unit 10 to amplify the pulses developed by the radiation detector therein and the collar finder signal, as well as controlling the firing of the individual charges or banks of charges of the perforating gun, which electrical schematic diagram is shown in Fig. 12 of the drawings, the radiation detector 30 provided in the subsurface unit 10 may comprise any suitable device such as a Geiger-Müller counter, a proportional counter or a scintillation counter which is adapted to produce pulses in response to radiations intercepted by the device 30 as the sursurface unit 10 traverses the borehole. In accordance with an important feature of the present invention, the pulses produced by the detector 30 are amplified and shaped to uniform amplitude and duration by means of a series of transistor stages which require relatively low operating potentials and will withstand high pressure, shock and vibration without deterioration thereof. More particularly, the pulses produced by the detector 30 are coupled through a condenser 31 to the base electrode of a first transistor amplifier 32 the emitter of which is connected to ground and the collector of which is connected through a load resistor 33 to the B+ supply conductor 34. The pulses produced at the collector of the transistor 32 are coupled through a condenser 35 to the base electrode of a second transistor amplifier 36 wherein these pulses are further amplified and are coupled through a condenser 37 to a third transistor amplifier 38 wherein the pulses receive further amplification. The pulses produced at the collector of the transistor 38 are coupled through a condenser 39 to the base electrode of a transistor 40 which forms one section of a univibrator, the other section of which comprises a transistor 41, the collector of the transistor 41 being coupled to the base electrode of the transistor 40 through a condenser 42 and the collector of the transistor 40 being coupled through a condenser 43 to the base electrode of the transistor 41. The amplified pulses supplied to the base electrode of the transistor 40 serve to trigger the univibrator 40, 41 so that pulses of uniform amplitude and duration are produced at the collector of the transistor 41, these pulses being supplied through a network comprising a parallel connected condenser 45 and resistor 46 to the primary 47 of a coupling transformer 48 the secondary 49 of which is adapted to be connected to the center conductor of the cable 12.

In order to provide the desired sequence of operations in a combined well logging and perforating gun firing system while employing the unitary subsurface unit 10, the center conductor 13 of the cable 12 is coupled through a condenser 55 to the actuating oil 56 of a stepping switch indicated generally at 57, and a battery 58 is provided at the earth's surface which may be selectively connected to the center conductor 13 of the cable 12 in place of the subsurface unit 10 by means of the selector switch 59. When the switch 59 is thrown to the position in which the battery 58 is connected to the center conductor 13, a pulse of current flows through the winding 56 of the stepping switch 57 so that the movable arm 60 of this switch is moved from the first contact 61, which is open, to the contact 62 so that the center conductor 13 of the cable 12 is connected through the movable arm 60 and the contact 62 to the winding 49 of the transformer 48. Accordingly, pulses produced across the winding 49 are impressed upon the cable conductor 13 and are transmitted over this cable to the portable surface equipment unit 11 at the surface.

In order to provide suitable operating potentials for the transistor amplifiers described above and the radiation detector 30, a power transformer 65 is provided in the subsurface unit 10 the primary winding 66 of which is connected through a choke coil 68 to the contact 62 and through a condenser 67 to ground. The portable surface equipment unit 11 is arranged to supply alternating current power to the center conductor 13 of the cable 12 and when the stepping switch 57 is moved to the position in which the arm 60 engages the contact 62 alternating current is supplied to the power transformer 65. The upper end of the secondary 70 of the transformer 65 is connected to a group of rectifiers 71, 72, 73 and 74 which are connected in series to the filter condenser 75, a second filter section comprising the series resistor 76 and the shunt condenser 77 being provided. A voltage regulating tube 78 is connected in series with the resistor 79 across the condenser 77 so that a regulated high voltage is provided for the radiation detector 30, this voltage being supplied through the load resistor 79 to the device 30. The transformer 65 is also provided with another winding 85, one end of which is connected to ground and the other end of which is connected through a resistor 86 and a rectifier 87 to a first filter condenser 88, a second filter section comprising the resistor 89 and the condenser 90 being provided so that a unidirectional operating potential which is negative with respect to ground is provided for the transistors which are employed to amplify and shape the pulses produced by the radiation detector 30.

In order to provide correlated indications of the depth to which the surface unit 10 is lowered, a pair of collar finder coils 100, 101 are provided in the subsurface unit 10 to detect changes in the magnetic properties of the casing as the unit 10 traverses the borehole. To supply operating current to the collar detector circuit, a winding 102 is provided on the transformer 65, one end of which is grounded and the other end of which is connected to the resistors 103 and 104 which form two arms of a bridge circuit the other two arms of which comprise the collar finder coils 100 and 101. An output voltage is taken from this bridge circuit by means of the output transformer indicated generally at 105 the center tap secondary winding 106 of which is connected to the rectifiers 107 and 108 so as to provide a unidirectional voltage proportional to bridge unbalance across the filter condenser 109. This voltage is further filtered in the series choke coils 110 and 111 and the shunt condensers 112 and 67 so that a unidirectional voltage proportional to bridge unbalance produced by the difference in magnetic characteristics of the casing adjacent the two coils 100 and 101 is produced across the condenser 67. Since this condenser is in series with the primary winding 66 and the choke coil 68 the unidirectional collar finder signal is also impressed upon the center conductor 13 of the cable 12 when the arm 60 is positioned to engage the contact 62. This collar finder signal is thus transmitted over the cable 12 to the earth's surface and is supplied to the portable surface equipment until 11 wherein it is employed to produce a collar indication on the strip chart of the recorder.

Figure 11:
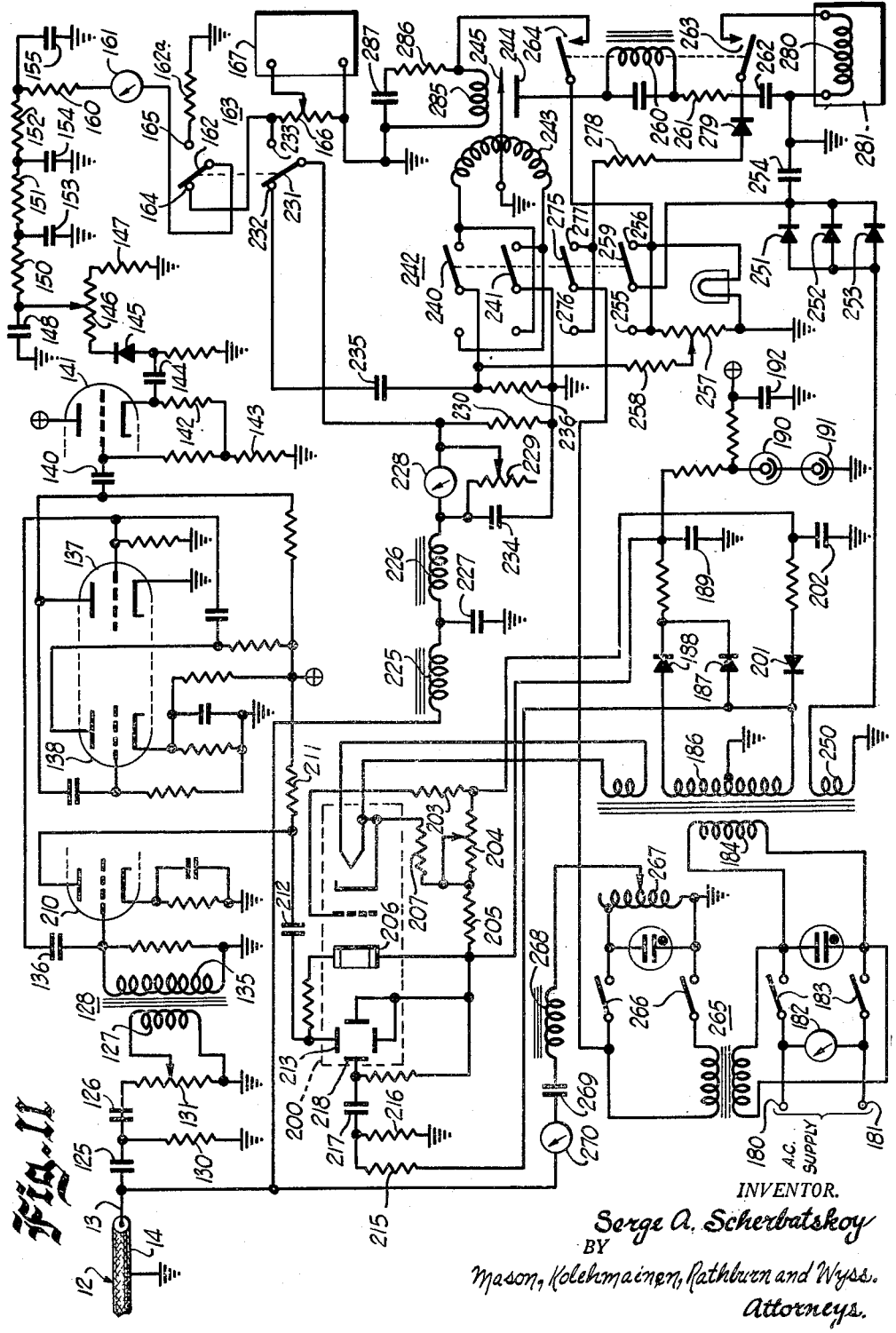
Fig. 11 is an electrical schematic diagram of the surface unit shown in Fig. 3.

Considering now the electrical circuits provided in the surface equipment unit 11, which is shown in detail in Fig. 11 of the drawings, the radiation detector pulses which are amplified and shaped in the subsurface unit 10, are transmitted over the cable 12 to the portable surface unit 11 wherein they are applied to a pulse detector channel in which the pulses are further shaped and are applied to a frequency metering arrangement which is effective to produce a voltage having an amplitude proportional to the frequency of occurrence of the pulses. More particularly, the pulses appearing on the center conductor 13 are coupled through the series connected condensers 125 and 126 to the primary winding 127 of a coupling transformer 128. The condensers 125 and 126 together with the shunt resistor 130 and the shunt potentiometer 131 provide a high pass filter arrangement which is effective to separate the radiation detector pulses from the alternating current power supplied to the cable 12 by means to be described in more detail hereinafter as well as the collar finder signal which is impressed upon this cable in the subsurface unit 10 as described in detail heretofore. The pulses produced across the secondary winding 135 of the transformer 128 are coupled through a condenser 136 to the control grid of a triode tube 137 which forms one section of a univibrator, or one-shot multivibrator, the other section of which comprises a triode tube 138. The tubes 137 and 138 are cross connected to form a conventional multivibrator circuit arrangement, the pulses coupled through the condenser 136 to the grid of the tube 137 being employed to trigger the multivibrator 137, 138 so as to produce pulses of uniform amplitude and duration at the anode of the tube 137. These shaped pulses are coupled through a condenser 140 to the control grid of a cathode follower tube 141 and appear in like polarity across the cathode resistors 142 and 143 of this tube. The output of the cathode follower 141 is coupled through a condenser 144 to a rectifier 145 the cathode of which is connected in series with a potentiometer 146 and a resistor 147 to ground. The arm of the potentiometer 146 is connected through a condenser 148 to ground so that a rectified potential is developed across the condenser 148 and the magnitude of this potential may be varied by adjusting the arm of the potentiometer 146. To provide a smoothing or integrating function for the rectifier output potential a three-section low pass filter is provided comprising the series resistors 150, 151 and 152 and the shunt condensers 153, 154 and 155, so that a suitable frequency metering output signal is produced across the condenser 155 which is proportional to the rate of occurrence of the pulses supplied to the surface unit 11. The signal developed across the condenser 155 is coupled through a resistor 160, a meter 161 which indicates the frequency of occurrence of the radiation pulses, the arm 162 of one section of a gamma ray-collar log selector switch indicated generally at 163, the arm 162 being movable between the contacts 164 and 165, through the contact 164 and a potentiometer 166 to ground. The voltage developed between the arm of the potentiometer 166 and ground is applied to the continuous strip chart recorder portion of the surface unit 11, indicated generally by the block 167. The signal thus applied to the recorder 167 functions to move the recording pen thereof transversely of the strip chart of the recorder so that a continuous log of the intensity of radiations detected by the detector 30 in the subsurface unit 10 is provided.

In order to provide suitable operating potentials for the tubes in the above described frequency metering channel, a suitable alternating current supply voltage is applied to the input terminals 180 and 181 of the portable surface equipment unit 11, this voltage being indicated by the line voltage meter 182 and being supplied through the main on-off switch 183 to the primary winding 184 of a power transformer 185. The center tapped winding 186 of the transformer 185 is employed in conjunction with the full wave rectifiers 187 and 188 to develop a unidirectional operating potential across the filter condenser 189, this potential being regulated by means of the series connected regulating tubes 190 and 191 to provide a regulated potential of some lower value across the filter output condenser 192 which latter voltage is supplied to the tubes in the frequency metering channel.

In order to provide a display for the pulses transmitted over the cable 12 to the surface unit 11 so that the operation of the system may be continuously monitored and evaluated, there is provided a small cathode tube, indicated generally at 200, which is positioned on the control panel of the surface unit 11, as will be described in more detail hereinafter. A rectifier 201 which is connected to the bottom end of the center tapped winding 186 is employed in conjunction with a filter condenser 202 to provide a negative energizing potential for the cathode ray tube 200. More particularly, the voltage produced across the condenser 202 is applied through a resistor 203 to the control grid of the cathode ray tube 200 and this voltage is also applied through a potentiometer 204 and a resistor 205 to the positive operating potential which is developed across the condenser 189, this potential also being impressed upon the focusing electrode 206 of the cathode ray tube 200. The cathode of the cathode ray tube 200 is connected through a resistor 207 to the arm of the potentiometer 204 so that a variable bias arrangement is provided. The detector pulse signal developed across the winding 135 of the coupling transformer 128 is impressed upon the control grid of an amplifying and isolating triode 210, the anode of which is connected through a resistor 211 to the potential developed across the condenser 192 so that an amplified signal is developed across the resistor 211. This amplified signal is coupled through a condenser 212 to the upper deflection plate 213 of the cathode ray tube 200.

In order to provide a deflection or scanning waveform for the cathode ray tube 200 so that the pulses developed across the winding 135 may be examined and monitored, the alternating current voltage developed across the bottom half of the center tapped winding 186 is coupled through a voltage divider comprising the resistors 215 and 216 and a coupling condenser 217 to the left-hand deflection electrode 218 of the cathode ray tube 200 so that a time base waveform is provided for the deflection signal impressed upon the deflection plate 213.

In order to separate the signal derived from the collar finder coils 100, 101 in the subsurface unit 10, which signal provides an indication of the magnetic properties of the well casing including the location of casing collars, this signal is coupled from the center conductor 13 of the cable 12 to a low pass filter which includes the series choke coils 225 and 226 and the shunt condensers 227 and 234 so that an essentially unidirectional voltage is produced across the condenser 234 and the detector pulses and alternating current power supplied to the subsurface unit are prevented from passing through this condenser. A collar logging signal meter 228, which is shunted by a potentiometer 229, is connected in series to a first load resistor 230 the ungrounded end of which is connected to the arm 231 of the second section of the gamma ray-collar log selector switch 163, this arm cooperating with the contacts 232 and 233 of this switch. When the switch 163 is in the gamma ray position shown in Fig. 11 the arm 231 engages the contact 232 so that the collar logging signal developed across the resistor 230 is coupled through a condenser 235 to a load resistor 236.

In order to provide relatively sharp casing collar indications on the strip chart of the recorder in response to the more slowly varying fluctuations in the collar locating signal derived from the collar finder coils 100, 101 as casing collars are traversed, there is provided a sensitive relay arrangement which is actuated each time the collar locating signal exceeds a predetermined bias level and actuation of the sensitive relay circuit is employed to control a D.C. power relay which in turn energizes a recording relay which mechanically drives the collar log recording pen. More particularly, the voltage developed across the resistor 236 is coupled through the arms 240 and 241 of a four-pole double throw reversing switch indicated generally at 242 to the winding 243 of a sensitive relay, which includes a fixed contact 244 and a movable armature 245.

In order to provide a variable bias for the sensitive relay coil 243, the alternating current voltage produced across a winding 250 of the power transformer 185, which voltage may also be employed to energize the filaments of the vacuum tubes provided in the surface unit 11, is supplied through the parallel connected rectifiers 251, 252 and 253 and a filter condenser 254 to ground so that a positive unidirectional potential of approximately seven volts is produced across the condenser 254. This voltage is connected to the arm 259 of one section of the reversing switch 242 and is supplied through either the cooperating contact 255 or the contact 256 to a potentiometer 257 the arm of which is connected through a resistor 258 to the load resistor 236. Accordingly, by variation of the position of the arm of the potentiometer 257 a variable bias voltage may be applied to the load resistor 236 so as to vary the bias point at which the sensitive relay coil 243 is actuated to close the contacts 244, 245 thereof.

When the contacts 244, 245 are closed a circuit is closed from ground through the coil 260 of a D.C. power relay, a resistor 261 and a condenser 262 back to ground. A relatively large unidirectional potential is developed across the condenser 262 so that when the above circuit is completed current flows through the relay coil 260 and the contacts 263 and 264 thereof are closed. In order to provide the necessary energizing potential across the condenser 262, the A.C. supply voltage which is produced across the primary winding 184 of the power transformer 185 is coupled through an isolating transformer 265 to an on-off switch 266 which controls the application of A.C. power through a variac 267, a choke coil 268, a condenser 269 and a down-the-hole current meter 270 to the center conductor 13 of the cable 12. The voltage produced across the secondary winding of the isolating transformer 265 is connected to an arm 275 of the reversing switch 242 and is supplied through either the contact 276 or the contact 277, a resistor 278 and a rectifier 279 to the condenser 262 so that a voltage in the order of 150 volts D.C. is produced across the condenser 262. Accordingly, when the contacts 263 of the power relay 260 are closed a substantial unidirectional voltage is impressed upon the coil 280 which is associated with the collar log recording pen assembly indicated generally at 281 so as to cause this pen to be actuated and produce a sharp mark or pip on the strip chart of the recorder coincident with the traversal of a casing collar by the subsurface unit 10.

In order to insure that the contacts 244, 245 do not stick together after the current level in the coil 243 decreases below the minimum bias level, there is provided an unsticking coil 285 which is positioned adjacent the armature 254 and is adapted to pull the contact 245 away from the fixed contact 244 when the coil 285 is energized. Accordingly, when the power relay coil 260 is energized and the contacts 264 thereof are closed the bias potential produced across the condenser 254 is also connected through the arm 259 of the reversing switch 242 and the contact 264 to the coil 285, one end of which is connected to ground. As soon as the contacts 264 are closed current is supplied to the coil 285 so that the armature 245 is attracted and pulled away from the fixed contact 244 with the result that the circuit to the actuating coil 260 of the D.C. relay is broken and the contacts 263 and 264 thereof are opened. In order to prevent the abrupt increase of current in the coil 285 a condenser 287 is connected in series with a resistor 286 across the coil 285 so that when the contacts 264 are closed the current to the coil 285 builds up at a relatively slow rate. With this arrangement, the contacts 263 and 264 of the D.C. relay remain closed for a sufficient length of time to insure that the solenoid 280 actuates the collar log recording pen before these contacts are opened.

In the event that a continuous log of the magnetic properties of the casing is desired in place of the continuous radiation log, the gamma ray-collar log switch 163 may be reversed so that the radiation logging signal is connected to ground through a resistor 162a and the collar logging signal is connected to the potentiometer 166. With this arrangement the recording pen assembly 326 is moved in accordance with variations in the magnetic properties of the well casing so that a continuous log is provided on the strip chart of the recorder 167.

Considering now the manner in which the above described electrical components are mounted in the portable surface equipment unit 11 so that a compact portable unit is provided, all of the surface equipment is contained in a unit of about the same dimensions as a conventional suitcase which comprises a bottom member 300 and a removable lid member 301 which is secured to the bottom member 300 by means of the clips 302, the bottom member 300 being provided with a handle 303 so that the unit 11 can be readily transported. Within the bottom member 300 there is mounted a base member indicated generally at 305 which includes a lower deck portion 306 on which is mounted the recorder of the unit 11 and a raised deck portion 307 provided with a central aperture 308 which is adapted to receive the control panel 309 of the unit on which the meters of the system are mounted and which carries most of the electrical components of the system described in detail heretofore in connection with Fig. 11. More particularly, the recorder 167 of the unit 11 is mounted on a pair of parallel bar members 316 and 317 which are pivotally connected to the lower deck portion 306 by means of the hinges 318 and 319. A pair of L-shaped blocks 320 and 321 are mounted on the deck portion 306 and the bar members 316 and 317 are provided with downwardly extending foot portions 323 and 324 which are adapted to rest on the deck portion 306 adjacent the blocks 320 and 321 so as to prevent the recorder 167 from shifting on the deck portion 306, a spring member 328 being secured to the transverse partition wall 329 of the base member 305 and being adapted to engage the bar 317 to provide further stability for the recorder 315.

Across the front of the recorder 315 there is provided a cylindrical bar 325 which is secured at its ends to the bar members 316 and 317 and on which are slidably mounted the radiation recording pen assembly 326 and the collar log recording pen assembly 281. The recorder 167 may comprise any suitable type of instrument which will function with the direct current signal produced across the resistor 166 to provide corresponding proportional movement of the recording pen assembly 326. In the illustrated embodiment the recorder 167 comprises a motor driven self balancing potentiometer arrangement which is provided with a drive wheel 330 which is connected by means of the dial cord 331 to the recording pen assembly 326 so that rotation of the wheel 330 is translated into transverse movement of the pen assembly 326 along the bar 325. The collar log recording pen assembly 281 is mounted on the same bar 325 as the pen assembly 326 but is not connected to or actuated by the drive wheel 330 of the recorder 167, as will be described in more detail hereinafter.

In order to position the tape-like strip chart 340 of the recorder for engagement by the recording pen assemblies 326 and 281, there is provided a chart receiving recess 341 (Fig. 4) in the lower deck portion 306 within which are mounted the end clips 342 and 343 which are adapted to receive the chart spool 344. The chart 340 extends beneath a hold-down bar 350 which is secured to the deck portion 306 and beneath a pair of alignment members 351 and 352 which are provided with apertures 353 and 354 which are aligned with the edge perforations of the chart 340 so that the sprockets driving the chart may extend through these apertures.

In order to drive the chart 340 in synchronism with movement of the subsurface unit 10 within the borehole, there is provided a selsyn motor 360 which is mounted on a bracket 361 secured to the base member 305 and carried by the bottom housing 300. A knurled adjustment wheel 362 is secured to the end of the output shaft 363 of the selsyn motor 360, the wheel 362 extending through an aperture 364 in the deck portion 306 so that the output shaft 363 may be adjusted manually by movement of the wheel 362. The stator of the selsyn motor 360 is electrically connected to the stator of the selsyn generator 25 which is geared to the cable drum 20 so that the output shaft 363 of the selsyn motor 360 rotates in synchronism with the drum 20 which is used to reel and unreel the cable as the unit 10 traverses the borehole.

A worm 370 is secured to the output shaft 363 and cooperates with a worm wheel 371 positioned on a vertically extending shaft 372 which is journalled in a casting 373, the casting 373 being secured to the end bell 374 of the selsyn motor 360 by means of the rods 375 which normally hold the end bells of the motor 360 in place. A bevel gear 376 positioned on the upper end of the shaft 372 cooperates with a bevel gear 377 on a horizontally extending shaft 380 which is also journalled in the casting 373. A sprocket 381 which is secured to the end of the shaft 380 is connected by means of the chain 382 to a sprocket 383 positioned on the end of the input shaft 384 of a digital indicating counter 385 which is mounted on the top of the casting 373. Accordingly, when the shaft 363 of the selsyn motor 360 is rotated the counter 385 is driven therefrom so as to provide a digital indication of depth which is visible through a slot 386 (Fig. 4) in the top deck portion 307.

Figure 5:
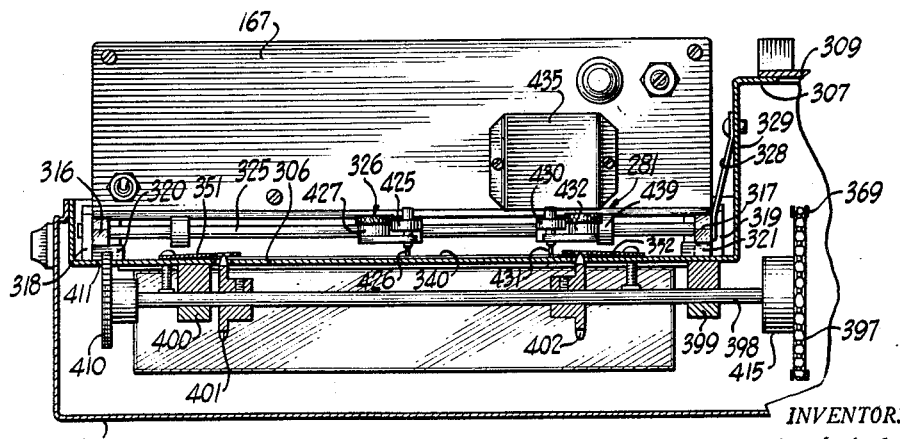
Fig. 5 is a sectional view taken along the lines 5—5 of Fig. 3.

The shaft 380 is also employed to drive the chart 340 but is disengageable from the chart by means of a clutch member indicated generally at 390. More particularly, the clutch 390 includes a sleeve-like member 391 which is slidably mounted on the shaft 380 and is provided with slots 392 in one end thereof which are adapted to receive a pin 393 extending transversely through the shaft 380. When the sleeve 391 is in the position shown in Fig. 6 of the drawings, the pin 393 is positioned in the slots 392 so that the sleeve 391 is rotated with the shaft 380. However, when the sleeve 391 is pulled outwardly to a position adjacent a flange member 394 secured to the end of the shaft 380, the inner end of the sleeve 391 is moved clear of the pin 393 so that the shaft 380 is disengaged from the sleeve 391. A sprocket 395 is secured to the sleeve 391 and is connected through a chain 396 to a larger sprocket 397 which is secured to one end of a chart drive shaft 398 which is journalled in the bearing blocks 399 and 400 (Fig. 5) secured to the lower deck portion 306. A pair of sprockets 401 and 402 are positioned on the drive shaft 398 and are adapted to engage the apertures in the edge of the chart 340 so that upon rotation of the shaft 398 the chart 340 is withdrawn from the spool 344 and is moved outwardly towards the edge of the unit 11 in synchronism with the movement of the subsurface unit 10 within the borehole.

In order to provide a detent for the clutch sleeve 391, this sleeve is provided with grooves 405 and 406 and a spring detent member 407, which is mounted on the casting 373, is provided with a raised portion 408 which is adapted to engage either the groove 405, when the clutch sleeve 391 is in the driving position, or the groove 406 when the clutch 390 is disengaged.

In order to adjust the chart 340 relative to the recording pen assemblies while the clutch 390 is engaged, there is provided a knurled thumb wheel 410 which is positioned on the chart drive shaft 398 and extends through an aperture 411 in the lower deck portion 306 and the shaft 398 is connected to the sprocket 397 by means of the friction clutch arrangement shown in Fig. 8 of the drawings. Referring to this figure, a hub member 415 is secured to the shaft 398 by means of the set screw 416 and a friction end washer 418 is adapted to interconnect the end face of the hub 415 and a leather washer 419 which engages the hub portion of the sprocket 397. Since the sprocket 397 is connected through the above described gearing to the worm and worm wheel assembly 370, 371 it would not be possible to adjust the chart 340 by manipulation of the thumb wheel 410, if the clutch 418, 419 were not provided since the worm wheel 371 cannot move the worm 370. However, by providing the above described slip clutch arrangement which includes the elements 418 and 419, the chart 340 may be adjusted by manually adjusting the thumb wheel 410 after the depth indicator 385 has been set to the desired value while the clutch 390 is disengaged. In this connection it will be understood that the clutch 390 can provide a coarse adjustment of position between the shaft 363 and the chart 340 by disengaging the clutch 390 and thereafter shifting the chart 340. However, since the pin 393 engages the slots 392 at only discrete portions of a revolution of the sleeve 391 it is not possible with the clutch 390 to provide continuous or fine adjustment of the chart position. However, by adjustment of the thumb wheel 410 after the clutch 390 has been reengaged the chart 340 may be positioned on the desired line thereof in accordance with the setting of the depth indicator 385, due to the action of the slip clutch 418, 419.

The radiation recording pen assembly 326 comprises an L-shaped block 425 which is slidably positioned on the bar 325 and carries at the outer end thereof a capillary tube 426 which is adapted to engage the chart 340 and provide a permanent record thereon. A covered inkwell 427 is arranged to supply ink to the capillary tube 426. The collar log pen assembly 281 includes an L-shaped block 430 which is slidably mounted on the bar 325 and supports at the outer end thereof a capillary tube 431 which is adapted to engage the chart 340, a covered inkwell 432 being provided for the capillary tube 431. In order to move the block 430 along the bar 325 upon energization of the relay coil 280, the coil 280 is mounted in a housing 435 which is secured to the side of the recorder 315. A pivotally mounted armature 436 is positioned within the housing 435 and adjacent the coil 280, the armature 436 extending into an aperture 437 in the block 430, as best illustrated in Fig. 13. A spring 438 normally biases the armature 436 so that the block 430 is urged into engagement with a collar 439 positioned on the bar 325. However, when the coil 280 is energized in the manner described heretofore in connection with the description of the electrical circuit diagram of Fig. 11, the armature 436 is attracted by the coil 280 so that the block 430 is moved away from the collar 439 and the pen 431 moves a short distance along the bar 325. As soon as the solenoid 280 is deenergized the spring 438 returns the block 430 to its initial position so that a sharp pip or mark is produced on the chart 340 upon each traversal of the casing collar by the subsurface unit 10. The radiation recording pen 426 is displaced along the length of the chart 340 with respect to the collar log pen 431, as best illustrated in Fig. 3, the displacement of these pens being equivalent to the physical displacement of the radiation detector 30 from the collar finder coils 100, 101 in the subsurface unit 10. Accordingly, the depth indications provided by the collar log marks produced by the collar log pen 431 are accurately correlated with the radiation log recorded by the pen 426.

On the control panel 309 the meters 161, 182, 228 and 270 are mounted in the manner shown in Fig. 3 so as to provide continuous indications of the electrical operation of the unit 11. In addition, a micrometer adjustment knob 450 is provided for the adjustment of the potentiometer 166 which provides the input to the recorder 167. With such a micrometer adjustment the input range to the recorder 167 may be varied over a wide range of, for example, 10 to 1, so that relatively large movements of the recording pen 426 may be provided on the chart 340 for either strong or weak radiations. An adjustment member 451 is also provided on the control panel 309 for the variac 267 so that the current supplied to the subsurface unit may be varied, as indicated on the cable current meter 270. Preferably the oscilloscope 200 is provided with a light shield 452 so as to facilitate interpretation of the display provided thereon, The sensitive relay 243 and its movable contact 245 are incorporated in a meter type housing 453 which is also positioned on the control panel 309 so that deflection of the armature 245 may be visually detected as well as by actuation of the collar log recording pen 431.

Considering now the manner in which the above described well logging and perforating system is employed in actually logging a well and perforating the well casing, the counter 385 is adjusted to zero by manipulation of the thumb wheel 362 while the subsurface unit 10 is at the surface. In order to adjust the counter 385 the alternating current signal to the selsyn motor 360 is removed so that the rotor of this selsyn may be rotated to obtain a zero reading on the counter 385, as will be readily understood by those skilled in the art. The clutch 390 is then disengaged so that the chart driving mechanism does not function and the subsurface unit 10 is lowered into the well to the bottom thereof. With this arrangement the chart 340 is not driven during the period when the subsurface unit 10 is lowered into the well since the radiation logging operation is performed from the bottom of the well to the top thereof and if the chart 340 were controlled during the lowering operation it would be driven in the wrong direction. It will, however, be noted that the counter 385 remains connected to the selsyn motor 360 at all times so that a continuous indication of depth is provided on this counter irrespective of the condition of the chart driving mechanism.

When the subsurface unit 10 reaches the bottom of the hole the clutch 390 is engaged and the thumb wheel 410 is adjusted so that the recording pen 426 engages one of the heavy lines of the chart 340, these lines being preferably spaced apart by a distance equivalent to twenty feet within the well. It will be noted that during such adjustment of the chart 340 the setting of the counter 385 is not changed since this counter is directly connected to the worm 370 and hence movement of the thumb wheel 410 to adjust the chart merely causes the slip clutch 418, 419 to be disengaged from the sprocket 397. When the recording pen 426 has been adjusted to the proper line, the logging operation is started and the subsurface unit 10 is raised by means of the drum 20. Preferably, the depth at which the logging operation was started, as determined by the counter 385, is noted opposite the line on the chart at which the log was started so as to correlate the depths indicated by the counter 385 with the radiation log and the collar indications provided by the recording pen 431.

When the log has been completed through the desired portion of the well, the portion of the chart 340 which contains the log may be torn off of the supply spool and the log is then interpreted to determine where the casing is to be perforated. When it has been desided where the casing is to be perforated the subsurface unit 10 is lowered to the correct position in which the explosive jet charges of the perforating portion 15 of the subsurface unit 10 are at the desired depth and the switch 59 is then moved from the radiation logging position shown in Fig. 1 to the position in which the battery 58 is connected to the center conductor of the cable 12 so that a pulse of current is applied to the coil 56 of the stepping switch 57 and the movable arm 60 thereof is moved to the next contact 500. The contact 500 is open so as to provide a guard position in the event of inadvertent movement of the switch 59. However, when the switch 59 is disconnected from the battery 58 and is then reconnected thereo another pulse of current flows through the coil 56 which steps the arm 60 to the terminal 501 in which position the potential of the battery 58 is applied to the firing cap indicated generally at 502 of the first explosive charge in the section 15. If the charges are to be fired sequentially the stepping switch 57 is stepped sequentially to the contacts 503 and 504 so that the firing caps 505 and 506 are sequentially detonated. On the other hand, it will be understood that the charges may be arranged in two or more banks in which case one complete bank of charges is fired each time the stepping switch is moved to a different position. In this connection it will be noted that when the switch 59 is moved to connect the battery 58 to the cable 12 the connection to the portable surface equipment unit 11 is broken so that the D.C. potential of the battery 58 does not affect the collar logging portion of the unit 11 which responds to a unidirectional voltage. Accordingly, no false indications are provided on the chart 340 during the casing perforating operation.

While there has been described what is at present considered to be the preferred embodiment of the invention, it will be understood that various modifications may be made therein which are within the true spirit and scope of the invention as defined in the appended claims.

What is claimed as new and is desired to be secured by Letters Patent of the United States is:

1. A radioactivity well logging system comprising a subsurface unit, a single conductor cable for lowering said unit into a borehole, radiation detector means positioned within said unit and operative to produce pulses in response to radiations intercepted thereby, means in said unit for amplifying said pulses and for coupling said amplified pulses to said single conductor cable, collar finder means independent of said radiation detector means and positioned within said unit, said collar finder means being operative to produce a signal proportional to the magnetic properties of a metallic casing within the borehole, means for coupling said magnetic signal to said single conductor cable, means at the earth's surface for separating said pulses from said magnetic signal, means for converting said separated pulses into a voltage having an amplitude proportional to the rate of occurrence of said pulses, a strip chart recorder, means normally supplying said voltage to said recorder, and switch means for selectively supplying said separated magnetic signal to said recorder in place of said voltage.

2. A radioactivity well logging system comprising a subsurface unit, a single conductor cable for lowering said unit into a borehole, radiation detector means positioned within said unit and operative to produce pulses in response to radiations intercepted thereby, means in said unit for amplifying said pulses and for coupling said amplified pulses to said single conductor cable, collar finder means independent of said radiation detector means and positioned within said unit, said collar finder means being operative to produce a signal proportional to the magnetic properties of a metallic casing within the borehole, means for coupling said magnetic signal to said single conductor cable, means at the earth's surface for separating said pulses from said magnetic signal, means for converting said separated pulses into a voltage having an amplitude proportional to the rate of occurrence of said pulses, a strip chart recorder provided with a first recording pen adapted to move laterally across the strip chart of said recorder, means normally supplying said voltage to said recorder to move said first recording pen in accordance therewith, a second recording pen, relay means to actuate said second recording pen and move the same laterally across said chart a predetermined amount in response to an applied voltage of predetermined magnitude, means normally supplying said separated magnetic signal to said relay means so that said second recording pen is actuating during peak amplitude portions of said magnetic signal representing the traversal of casing collars by said unit, and switch means for selectively supplying said separated magnetic signal to said recorder in place of said voltage.

3. A radioactivity well logging system comprising a subsurface unit, a single conductor cable for lowering said unit into a borehole, radiation detector means positioned within said unit and operative to produce pulses in response to radiations intercepted thereby, means in said unit for amplifying said pulses and for coupling said amplified pulses to said single conductor cable, collar finder means independent of said radiation detector means and positioned within said unit, said collar finder means being operative to produce a signal proportional to the magnetic properties of a metallic casing within the borehole, means for coupling said magnetic signal to said single conductor cable, means at the earth's surface for separating said pulses from said magnetic signal, means for converting said separated pulses into a voltage having an amplitude proportional to the rate of occurrence of said pulses, a strip chart recorder provided with a first recording pen adapted to move laterally across the strip chart of said recorder, means normally supplying said voltage to said recorder to move said first recording pen in accordance therewith, a second recording pen, relay means to actuate said second recording pen and move the same laterally across said chart a predetermined amount in response to an applied voltage of predetermined magnitude, said second recording pen being spaced from said first recording pen along the length of said chart by an amount equivalent to the spacing between said collar finder means and said radiation detector means in said subsurface unit, means normally supplying said separated magnetic signal to said relay means so that said second recording pen is actuating during peak amplitude portions of said magnetic signal representing the traversal of the casing collars by said unit, and switch means for selectively supplying said separated magnetic signal to said recorder in place of said voltage.

4. A radioactivity well logging system comprising a subsurface unit, a single conductor cable for lowering said unit into a borehole, radiation detector means positioned within said unit and operative to produce pulses in response to radiations intercepted thereby, means in said unit for amplifying said pulses and for coupling said amplified pulses to said single conductor cable, collar finder means independent of said radiation detector means and positioned within said unit, said collar finder means being operative to produce a signal proportional to the magnetic properties of a metallic casing within the borehole, means for coupling said magnetic signal to said single conductor cable, means at the earth's surface for separating said pulses from said magnetic signal, means for converting said separated pulses into a voltage having an amplitude proportional to the rate of occurrence of said pulses, a strip chart recorder provided with a bar extending transversely of said chart and a first recording pen assembly adapted to move along said bar in accordance with an applied signal, means normally supplying said voltage to said recorder to move said first recording pen in accordance therewith, a second recording pen assembly slidably mounted on said bar, a relay positioned above said bar and adapted when energized to move said second recording pen assembly a predetermined distance along the length of said bar, means normally supplying said separated magnetic signal to said relay means so that said second recording pen is actuated during peak amplitude portions of said magnetic signal representing the traversal of casing collars by said unit, and switch means for selectively supplying said separated magnetic signal to said recorder in place of said voltage.

5. A radioactivity well logging system comprising a subsurface unit, a single conductor cable for lowering said unit into a borehole, radiation detector means positioned within said unit and operative to produce pulses in response to radiations intercepted thereby, means in said unit for amplifying said pulses and for coupling said amplified pulses to said single conductor cable, collar finder means independent of said radiation detector means and positioned within said unit, said collar finder means being operative to produce a signal proportional to the magnetic properties of a metallic casing within the borehole, means for coupling said magnetic signal to said single conductor cable, means at the earth's surface for separating said pulses from said magnetic signal, means for converting said separated pulses into a voltage having an amplitude proportional to the rate of occurrence of said pulses, a strip chart recorder provided with a bar extending transversely of said chart and a first recording pen assembly adapted to move along said bar in accordance with an applied signal, means normally supplying said voltage to said recorder to move said first recording pen in accordance therewith, a second recording pen assembly slidably mounted on said bar, a relay positioned above said bar and adapted when energized to move said second recording pen assembly a predetermined distance along the length of said bar, said second recording pen being spaced from said first recording pen along the length of said chart by an amount equivalent to the spacing between said collar finder means and said radiation detector means in said subsurface unit, means normally supplying said separated magnetic signal to said relay means so that said second recording pen is actuating during peak amplitude portions of said magnetic signal representing the traversal of casing collars by said unit, and switch means for selectively supplying said separated magnetic signal to said recorder in place of said voltage.

6. In a radioactivity well logging system, a portable surface equipment unit comprising, a base member, a strip chart recorder pivotally mounted to said base member and provided with a transverse bar extending along the front edge thereof, said recorder including a first recording pen assembly movably mounted on said bar and means responsive to an electrical input signal for moving said first recording pen assembly proportionately, a chart spool receiving recess provided in said base member below said recorder, chart sprocket means carried by said base member and adapted to withdraw a strip chart from said recess in a direction perpendicular to said bar, a synchro receiver mounted on said base member and adapted to receive an electrical signal representing logging depth, and means connecting the output shaft of said receiver to said sprocket means, said last named means including a clutch for disengaging said output shaft from said sprocket means so that the position of said chart may be adjusted with respect to said recorder at any particular depth.

7. In a radioactivity well logging system, a portable surface equipment unit comprising, a base member, a strip chart recorder pivotally mounted to said base member and provided with a transverse bar extending along the front edge thereof, said recorder including a first recording pen assembly movably mounted on said bar and means responsive to an electrical input signal for moving said first recording pen assembly proportionately, a chart spool receiving recess provided in said base member below said recorder, chart sprocket means carried by said base member and adapted to withdraw a strip chart from said recess in a direction perpendicular to said bar, a synchro receiver mounted on said base member and adapted to receive an electrical signal representing logging depth, a depth indicating counter, and means connecting the output shaft of said receiver to said sprocket means and said depth indicating counter, said last named means including a clutch for disengaging said output shaft from said sprocket means so that the position of said chart may be adjusted with respect to said recorder at any particular depth.

8. In a radioactivity well logging system, a portable surface equipment unit comprising, a base member, a strip chart recorder pivotally mounted to said base member and provided with a transverse bar extending along the front edge thereof, said recorder including a first recording pen assembly movably mounted on said bar and means responsive to an electrical input signal for moving said first recording pen assembly proportionately, a chart spool receiving recess provided in said base member below said recorder, chart sprocket means carried by said base member and adapted to withdraw a strip chart from said recess in a direction perpendicular to said bar, a synchro receiver mounted on said base member and adapted to receive an electrical signal representing logging depth, a depth indicating counter, means including a worm and worm wheel assembly for connecting the output shaft of said receiver to said counter, and means connecting said worm wheel to said sprocket means, said last named means including a clutch for disengaging said sprocket means from said worm wheel so that the position of said chart may be adjusted with respect to said recorder without changing the setting of said counter.

9. In a radioactivity well logging system, a portable surface equipment unit comprising, a base member, a strip chart recorder pivotally mounted to said base member and provided with a transverse bar extending along the front edge thereof, said recorder including a first recording pen assembly movably mounted on said bar and means responsive to an electrical input signal for moving said first recording pen assembly proportionately, a chart spool receiving recess provided in said base member below said recorder, chart sprocket means carried by said base member and adapted to withdraw a strip chart from said recess in a direction perpendicular to said bar, a synchro receiver mounted on said base member and adapted to receive an electrical signal representing logging depth, a depth indicating counter, means including a worm and worm wheel assembly for connecting the output shaft of said receiver to said counter means connecting said worm wheel to said sprocket means, clutch means for disengaging said sprocket means from said worm wheel, and manually operable means on said output shaft for adjusting said depth indicating counter.

10. In a radioactivity well logging system, a portable surface equipment unit comprising, a pair of input terminals adapted to be supplied with alternating current power, a cable input terminal, frequency meter means connected to said cable input terminal for deriving an output voltage proportional to the frequency of occurrence of pulses supplied to said cable input terminal, a cathode ray tube, a power transformer connected to said pair of input terminals, means for deriving from said transformer a first unidirectional operating potential for said frequency meter means, means for deriving from said transformer a second unidirectional operating potential for said cathode ray tube, means for deriving from said transformer a deflection voltage for the electron beam of said cathode ray tube, and means for supplying a waveform from said frequency meter means to said cathode ray tube for display thereon.

11. In a radioactivity well logging system, a portable surface equipment unit comprising, a pair of input terminals adapted to be supplied with alternating current power, a cable input terminal, a variable voltage device connected to said cable input terminal and having one terminal thereof connected to ground, means including an isolating transformer for supplying alternating current from said pair of input terminals to said variable voltage device so that an alternating current of variable amplitude is supplied to said cable input terminal, frequency meter means connected to said cable input terminal for deriving an output voltage proportional to the frequency of occurrence of pulses supplied to said cable input terminal, a cathode ray tube, a power transformer connected to said pair of input terminals, means for deriving from said transformer a first unidirectional operating potential for said frequency meter means, means for deriving from said transformer a second unidirectional operating potential for said cathode ray tube, means for deriving from said transformer a deflection voltage for the electron beam of said cathode ray tube, and means for supplying a waveform from said frequency meter means to said cathode ray tube for display thereon.

12. In a radioactivity well logging system, a portable surface equipment unit comprising, a pair of input terminals adapted to be supplied with alternating current power, a cable input terminal, frequency meter means connected to said cable input terminal for deriving an output voltage proportional to the frequency of occurrence of pulses supplied to said cable input terminal, a cathode ray tube, a power transformer connected to said pair of input terminals, means for deriving from said transformer a first unidirectional operating potential for said frequency meter means, means for deriving from said transformer a second unidirectional operating potential for said cathode ray tube, means for deriving from said transformer a deflection voltage for the electron beam of said cathode ray tube, and means for supplying a waveform derived from said cable input terminal to said cathode ray tube for display thereon.

13. A combined radioactivity well logging and casing perforating system comprising a unitary subsurface unit adapted to be lowered into a borehole by means of a single conductor cable, radiation detector means in said unit and operative to produce pulses in response to radiations intercepted thereby, casing perforating means in said unit and adapted to operate upon the application of electrical current thereto, a stepping switch in said unit and having an actuating coil connected to the center conductor of said cable, said stepping switch being operable to a first position in which said center conductor is connected to receive pulses derived from said radiation detector means and a second position in which said center conductor is connected to said casing perforating means, and switch means at the earth's surface for successively applying direct current to the upper end of said cable so that said stepping switch is successively actuated to said first and second positions in response thereto.

14. A combined radioactivity well logging and casing perforating system comprising a unitary subsurface unit adapted to be lowered into a borehole by means of a single conductor cable, radiation detector means in said unit and operative to produce pulses in response to radiations intercepted thereby, casing perforating means in said unit and having a plurality of sections individually adapted to operate upon the application of electrical current thereto, a stepping switch in said unit and having an actuating coil connected to the center conductor of said cable, said stepping switch being operable to a first position in which said center conductor is connected to receive pulses derived from said radiation detector means and a plurality of other positions in which said center conductor is selectively connected to different sections of said casing perforating means, and switch means at the earth's surface for successively applying direct current to the upper end of said cable so that said stepping switch is successively actuated to said first position and to said plurality of positions in response thereto.

15. A system as defined in claim 13 wherein said stepping switch is provided with a guard position between said first and second positions in which guard position said center conductor is open circuited in the subsurface unit.

References Cited in the file of this patent
UNITED STATES PATENTS

| | | |
|---|---|---|
| 2,309,835 | Fearon | Feb. 2, 1943 |
| 2,617,042 | Wouters | Nov. 4, 1952 |
| 2,740,053 | Scherbatskoy | Mar. 27, 1956 |
| 2,802,951 | Seevers | Aug. 13, 1957 |
| 2,838,680 | Bender et al. | June 10, 1958 |
| 2,856,536 | Cardwell et al. | Oct. 14, 1958 |

OTHER REFERENCES

Transistorized Scintillation Counter, by L. A. Kueker, from Radio Electronics, March 1957, pages 34 to 37.